Patented July 8, 1941

2,248,635

UNITED STATES PATENT OFFICE 2,248,635

TREATMENT OF HALOGENATED POLYHYDRIC ALCOHOLS

Kenneth E. Marple and Theodore W. Evans, Oakland, Calif., assignors to Shell Development Company, San Francisco, Calif., a corporation of Delaware No Drawing. Application June 20, 1939,
Serial No. 280,066

15 Claims. (Cl. 260—348)

The present invention relates to the production of hydroxy-epoxides, and more particularly to a new and useful process for the production and recovery of hydroxy-epoxides by the treatment of halogenated polyhydric alcohols wherein the carbinol groups are either of primary or secondary character and wherein the hydroxy groups are in excess of the halogen atoms in the compound.

In one of its most specific embodiments the invention includes a practical and economical process for the production and isolation or recovery of glycidols (hydroxy-epoxides), and especially of glycidols in which the carbon atoms embraced in the epoxy structure are of primary or secondary character, i. e., linked to no more than two other carbon atoms. The invention provides a general method for the conversion of halogenated polyhydric alcohols, wherein the carbinol groups are of primary and/or secondary character and wherein the hydroxy groups are in excess of the halogen atoms, to glycidols (hydroxy-epoxides), this method providing for the efficient recovery of such glycidols from the mixtures resulting from the mentioned conversion step.

The glycidols (hydroxy-epoxides) are valuable compounds which are useful for a wide variety of solvent extraction and preparation purposes. They may be employed as extractants in numerous vegetable, animal and mineral oil extraction processes. They are also valuable as intermediates in the preparation of many useful organic compounds such as polyhydric alcohols, polyhydric alcohol ethers and esters, glycidol ethers and esters, carbonylic compounds, glyptal resins, etc. The invention, therefore, is of great technical importance because of the fact that it is easily and economically executed to obtain high yields of glycidols from glycerol monohalohydrins and related halogenated polyhydric alcohols, while employing inexpensive and readily available reactants. The invention is of further technical importance because it provides a method and means for recovering the glycidols from the reaction mixture containing some water, in a substantially pure and anhydrous condition with negligible losses due to hydration and other undesirable side reactions.

Although other methods of obtaining hydroxy-epoxides, and particularly glycidol, have been attempted, it has been previously found that any practical method of synthesis of these compounds usually requires a saturated or unsaturated halogenated polyhydric alcohol as the starting material. As stated, such halogenated polyhydric alcohols should contain at least one halogen atom and at least two carbinol groups of primary and/or secondary character. A representative suitable alcohol of this type is the glycerol monochlorhydrin of the formula:

$$CH_2OH\text{—}CHOH\text{—}CH_2Cl$$

Generally speaking, the glycidol may be prepared by removing HCl from the halogenated polyhydric alcohol of the class described. Thus, in the case of glycerol monochlorhydrin, the removal of such HCl leaves the glycidol

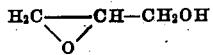

which is also called "1,2-epoxy propanol-3". Such removal of the HCl is usually accomplished by reacting a halogenated polyhydric alcohol of the class herein defined with a basic or basic-acting compound under conditions tending to favor the formation of the corresponding desired glycidol. Suitable basic compounds are the metal oxides, the metal hydroxides, the metal carbonates, the metal bicarbonates, the metal borates, etc. Preferably employed basic compounds are the alkali metal hydroxides, such as sodium and potassium hydroxides. In some cases, where it may be desirable, ammonia, basic ammonium compounds and organic bases, such as the amines, hydroxyl amine, etc., may also be used.

The reaction mixture resulting from this treatment of the halogenated polyhydric alcohol of the class defined comprises water, the hydroxy-epoxide, salt, unreacted halogenated polyhydric alcohol and some products of hydration of the hydroxy-epoxide. Thus, when glycerol monochlorhydrin is treated with sodium hydroxide under conditions defined hereinbelow, the reaction mixture, besides glycidol, also contains salt, water, some monochlorhydrin and glycerol. The quantity of water in such mixture will depend primarily on whether the base is employed in an anhydrous or aqueous state. However, in either case the reaction produces a certain amount of water.

The isolation or recovery of the hydroxy-epoxide (such as glycidol) from such reaction products has always been the chief difficulty in the preparation of the pure hydroxy-epoxide. The hydroxy-epoxide reacts with water, salts, acids, bases, and, to a lesser extent, with some reactive alcohols, to produce undesirable by-products. Also, heating of the hydroxy-epoxide in the presence of any of these agents tends to increase this undesirable action, thus making distillation an impractical method of recovering the compound from the above reaction products.

It has been proposed to prepare and isolate hydroxy-epoxides, such as glycidol, from the corresponding halogenated polyhydric alcohol (e. g. glycerol monochlorhydrin), by reacting it with anhydrous caustic such as sodium hydroxide, in the presence of ethyl alcohol or ether. However, it was found that such treatment of the starting materials was impractical either because of the low yields of hydroxy-epoxide or due to the relatively high cost of the reagents necessary. Also, the use of ethyl alcohol is conducive to the formation of certain ethers (such as glycerol monoethyl ether). Furthermore, hydroxy-epoxides, such as glycidol, are soluble in this alcohol, and it is practically impossible to effect the isolation of the glycidol from the alcoholic solution thus produced.

It is, therefore, the main object of the present invention to provide a process which will obviate the above and other defects, and simultaneously provide a relatively cheap, efficient and commercially adaptable process for the economic production and recovery of high yields of hydroxy-epoxides from halogenated polyhydric alcohols.

It has now been discovered that the above and other objects may be attained by employing certain solvents having definite and specific characteristics. Thus, it was found that high yields of the hydroxy-epoxide may be obtained by reacting the starting material with a basic-acting compound, such as sodium hydroxide, adapted to neutralize the hydrogen halide formed, and by distilling the reaction product, preferably after the removal, as by filtration, of the salt formed, in the presence of a solvent or solvent mixture described more fully hereinbelow, thereby first removing the water together with said solvent, then the anhydrous solvent, and finally recovering an overhead fraction comprising high yields of the anhydrous hydroxy-epoxide. The present process also prevents or greatly inhibits the hydration of the final desired product, thus increasing the yield of recoverable hydroxy-epoxides.

The salt formed during the neutralization of the hydrogen halide liberated in the course of the formation of the hydroxy-epoxide, has a detrimental effect on the rate of conversion of the halogenated polyhydric alcohol and on the yield of recoverable hydroxy-epoxide. This is due to the fact that the salt in the presence of water tends to cause the reverse reaction so that the hydroxy-epoxide is converted back into the halogenated polyhydric alcohol, thus decreasing the final yield of the desired product. Furthermore, this reaction is accompanied by the formation of a basic solution, which further reduces the hydroxy-epoxide yield since its polymerization is considerably greater in such alkaline solutions. Therefore, it is highly desirable to use a solvent which does not dissolve the salt so that its concentration in the solvent-water-hydroxy-epoxide solution would be at a minimum.

The solvent should also have considerable solubility for the water because such solvent thereby decreases the concentration of the water and thus prevents the detrimental action thereof (such as hydration) on the hydroxy-epoxide. In fact, the solvent should dissolve all of the water, thus preventing the formation of the detrimental water layer. In this connection it is to be noted that it is preferable to employ solvents which possess a relatively great solubility for water because the volume of such solvent necessary to hold the water in solution is thereby decreased.

As stated, the separation of water and the hydroxy-epoxide (such as glycidol) by distillation is difficult and results in considerable decomposition of the hydroxy-epoxide. On the other hand if the solvent forms a constant boiling mixture with the water, if this mixture contains relatively large percentages of water removable during distillation, and especially when distilled under reduced pressures, and if its boiling point is considerably below that of the hydroxy-epoxide to be purified, the use of such a solvent during the distillation step will effect a rapid dehydration of the solution without decomposition and/or distillation of the hydroxy-epoxide. Still another requirement of the solvent constituting one phase of the present invention, is that it should not react readily either with the reactants, such as the halogenated polyhydric alcohol, nor with the products of reaction.

Summarizing the above, it may therefore be stated that the solvent or solvent mixture to be employed according to the present invention preferably should have the following characteristics:

1. The salts formed during the reaction should be substantially insoluble in the solvent;
2. The solvent should be substantially miscible with water, should form upon distillation (and preferably at subatmospheric pressures) a constant boiling mixture with such water, and should carry over a relatively substantial quantity thereof in the azeotrope;
3. The solvent should have a boiling point substantially below that of the hydroxy-epoxide, and, in the case of a solvent for the recovery of glycidol, should boil below about 100° C.; and
4. The solvent should be substantially inert so that there would be little or no by-products resulting from the action of such solvent on the reactants or on the products of reaction.

Without any intention of being limited to the specific compounds enumerated herein, it may be stated that the following solvents are suitable for use in the present process, these compounds having characteristics which fall within the requirements set out above: isopropyl alcohol, n-propyl alcohol, n-butyl alcohol, secondary butyl alcohol, isobutyl alcohol, amyl alcohol, dioxane, etc.

Also, solvent mixtures of the type of ethyl alcohol and benzol, isopropyl alcohol and benzol, etc. may be used, these mixtures forming a ternary with water, thus permitting the removal of all of the water from the products of reaction during the earlier part of the distillation thereof. Therefore, the term "solvent" as used herein and in the appended claims is intended to include solvent mixtures of the class described.

The quantity of the solvent or solvent mixture to be employed will depend on a number of variables. Thus, it will vary depending on whether the conversion is effected with anhydrous or aqueous basic-acting compound, as well as on the solubility of water in such solvent. Also, since the water is to be removed by distillation as a C. B. M. (constant boiling mixture) with such solvent, the quantity of solvent will naturally further depend on the amount of water in the water-solvent azeotrope.

In operation, the halogenated polyhydric alcohol to be converted into the corresponding hydroxy-epoxide is commingled with the basic or basic-acting compound. If it is desired to obtain substantially only the corresponding hydroxy-epoxide as the reaction product, this basic compound is employed in an amount substantially equivalent to the reactive hydrogen halide content of the halogenated polyhydric alcohol. In this connection it was found, however, that it is possible to use somewhat greater quantities of such basic compound as long as such excess is neutralized substantially immediately after the completion of the conversion reaction. In other words, such neutralization should be effected before the excess basic compound detrimentally affects the reaction product as by polymerizing the hydroxy-epoxide.

In the preferred embodiment of the invention the halogenated polyhydric alcohol is commingled with the necessary or optimum quantities of the basic compound and of the solvent of the class described herein. The reaction is initiated on contact of the reactants. Although in some instances room temperatures may be employed, it is generally preferred to operate at lower temperatures. When glycerol monochlorhydrin is to be converted to glycidol, optimum temperatures are below about 10 to 15° C., and preferably in the neighborhood of between about 0° C. and —5° C. The higher temperatures cause undesirable by-product formation. Obviously, the lower temperature limit depends on the freezing point of the solvent employed. Also, very low temperatures retard the rate of conversion. Since the conversion reaction is exothermic in character, external cooling means are necessary when the reaction is to be effected at the above relatively low temperatures. In some cases, the heat liberated in the course of the reaction may be utilized to aid or to effect the distillation to be described below.

The solvent or solvent mixture of the class described is preferably added substantially together with the basic compound so as to prevent the formation of any separate water phase which, as stated above, would have detrimentally affected both the conversion of the starting material and the recovery of the desired hydroxy-epoxide. After the reaction has been allowed to continue for the desired or optimum period of time, the products of reaction are neutralized preferably to a pH value of 7, or as close thereto as is possible. This neutralization is effected while the reaction products are at the relatively low reaction temperature, thus preventing, or at least greatly inhibiting the polymerization of the hydroxy-epoxides. Preferably, the neutralization should be effected with an acid such as HCl in alcohol to the brom-thymol blue (dibromothymolsulfonphthalein) end point. However, in some cases, neutralization to the phenolphthalein end point may also be satisfactory.

The salt formed during the conversion reaction may be removed from the products of reaction by any known method, such as decanting, filtering or centrifuging, this de-salting step being effected either before or after the above-described neutralization step.

The de-salted and neutralized mixture is then subjected to a distillation to separate the hydroxy-epoxide in a substantially pure and anhydrous state. In order to prevent the decomposition of the desired product, such distillation should be preferably effected under a subatmospheric pressure. Since the water-solvent azeotrope boils considerably below the vaporization temperature of the hydroxy-epoxide, the first distillation removes such azeotrope thus leaving a substantially anhydrous residuum. This, in turn, may then be distilled under a subatmospheric pressure and at the boiling point of the hydroxy-epoxide, thereby recovering the latter in a pure and anhydrous state. The final residuum comprises the products of hydration, polymerization, etc., which may form as by-products during the conversion and distillation operations. When operating according to the present invention, and with the solvent of the class described, the quantity of such residuum is relatively negligible because the presence of such solvent greatly inhibits the undesirable side reactions. The residuum will also contain the halogenated polyhydric alcohol, if any, which was not converted into its hydroxy-epoxide. It is thus seen that the above process provides an efficient and economic process for the production and recovery of high yields of hydroxy-epoxides, such as glycidol, from the corresponding halogenated polyhydric alcohol.

The following examples illustrate suitable modes of executing the process of the invention, it being understood, however, that there is no intention of being restricted by the specific reactants and/or mode of operation illustrated hereinbelow.

*Example I*

About 221.0 gm. (2 mols) of glycerol α-monochlorhydrin ($CH_2$—OH—CHOH—$CH_2Cl$) and about 1300 c. c. of isopropyl alcohol were placed in a container and cooled to about —5° C. Thereafter, about 167.5 gm. (1.96 mols) of a 46% aqueous solution of sodium hydroxide were added slowly over a period of about one hour, the mixture being continuously stirred. After complete addition of the base the solution was stirred for an additional 30 minutes, the temperature being maintained at between about 0° and —5° C. After neutralizing the excess base (as by the addition of dilute HCl using bromthymol blue as the indicator), the salt formed during the conversion reaction was removed by filtration. The filtrate was then distilled under reduced pressure. The water-solvent constant boiling mixture (azeotrope) distilled over first, followed by the distillation of the anhydrous (excess) isopropyl alcohol. The resulting anhydrous mixture was then distilled at a pressure of about 8 mm. of mercury and a temperature of about 46°-48° C. The resulting vapors were separately condensed and collected, and were found to comprise a substantially pure and anhydrous glycidol

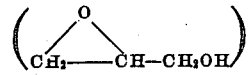

having an atmospheric boiling point of about 162° C. About 126.2 gm. (1.71 mol) of the glycidol was obtained. However, since about 9.4% of the monochlorhydrin was recovered in an unreacted form, the yield, based on the consumed monochlorhydrin, was about 94.1%.

*Example II*

The above operations were repeated using, however, dioxane

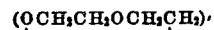

as the solvent. Also, in view of the higher freezing point of the dioxane, the conversion was effected at a temperature of about 4° C. The glycidol recovered after the vacuum distillation of the water-dioxane azeotrope (and of the anhydrous dioxane) comprised about 89.3% of the glycerol monochlorhydrin used, while, based on the consumed starting material, the yield of anhydrous glycidol was equal to about 93.8%.

*Example III*

About 82.5 gm. (1.96 mols) of powdered sodium hydroxide were added to about 1000 c. c. of absolute ethyl alcohol, the solution being cooled to about −6° C. Thereafter, a solution of about 221 gm. (2 mols) of glycerol monochlorhydrin in 220 c. c. of benzol and 50 c. c. of absolute ethyl alcohol, was slowly added to the first mixture over a period of about one hour, the whole being constantly stirred and maintained at between about 0° and −5° C. After an additional 30 minute agitation, the resulting mixture was treated as described in Example I, the vacuum distillation first effecting the distillation of the benzene-alcohol-water ternary mixture, followed by the distillation of excess solvent, so that the final portion of the vacuum distillation produced a substantially pure and anhydrous glycidol distillate representing about 92.3% of the consumed monochlorhydrin.

Although the above examples disclose the efficient and economic conversion of glycerol monochlorhydrin into glycidol, and the recovery of the latter from the products of reaction, it is clear that the above-described process is applicable to the treatment of other halogenated polyhydric alcohols whether they be of aliphatic, aralkyl or alicyclic character, and particularly, those which contain at least one halogen atom and at least two carbinol groups of primary and/or secondary character. Also, the halogenated polyhydric alcohols suitable as primary materials may be either of the type in which the halogen atom and a hydroxy group are linked to vicinal carbon atoms, or wherein a halogen atom and a hydroxy group are not linked, respectively, to vicinal carbon atoms.

Instead of adding the solvent substantially together with the basic compound, such addition may in some cases be delayed until the halogenated polyhydric alcohol has been reacted with the basic compound to produce the aqueous solution or mixture containing the hydroxy-epoxide. In such case, the solvent is added to the neutral aqueous solution of glycidol and unchanged starting material. It is seen that the extraction at this stage of operations, i. e. after neutralization, increases the range of solvents which may be used, since there is then little or no danger of the solvent reacting with the alkali or with the starting material. When operating according to this modification, it is therefore possible to use the following additional solvents or solvent mixtures: ketones, such as methyl ethyl ketone, ethyl acetate, and mixtures of ethanol, ethyl acetate and carbon tetrachloride, etc. If the solvent or solvent mixture is to be added to the halogenated polyhydric alcohol together with the basic compound, the use of the above enumerated compounds is, however, to be avoided because of their tendency to react with the alkali and/or starting material, thus adversely affecting the yield of hydroxy-epoxides. It is to be noted that the process in which the solvent is added after the treatment of the halogenated polyhydric alcohol with the basic compound is not as efficient as the preferred method described above, i. e. in which the solvent is added together with the basic compound. The main disadvantage of the modified process resides in the relatively low conversion rates (in the order of 65–70%) due to the displacement of the equilibrium because of the presence of relatively large quantities of salt. However, in some cases it may be desirable to sacrifice the yield, particularly because of the greater variety of solvents which may thus be employed for the separation of the hydroxy-epoxide.

Although the above disclosure has been made with particular reference to the production and recovery of high yields of hydroxy-epoxides, such as glycidol, from the described starting material, it is evident to those skilled in the art that the invention may be applied for the production, for example, of glycerol as a valuable by-product in the production of glycidol, or vice versa. Thus, frequently, in the production of glycidol it is not necessary that the process be executed to obtain a high yield of glycidol. In such a case, it is possible, by controlling the operating conditions, to obtain greater or lesser quantities of glycerol which is thus a valuable by-product of the glycidol process.

In view of the above, it is clear that the invention is not to be considered as being limited by any specific disclosure presented herein, but is co-extensive with and limited solely by the appended claims.

We claim as our invention:

1. A process for the conversion of glycerol monohalohydrin to the corresponding glycidol and for the recovery thereof from the products of reaction, which comprises commingling the glycerol monohalohydrin with a basic-acting compound and a solvent comprising alcohol and benzol, maintaining said mixture at subatmospheric temperature while in a state of agitation for a period of time sufficient to effect the conversion of the glycerol monohalohydrin to the corresponding glycidol, thereby producing a reaction mixture containing water, salt, solvent, unreacted glycerol monohalohydrin and glycidol, neutralizing said mixture, separating the salt from the liquid constituents of said mixture, distilling said remaining liquid mixture to recover as an overhead fraction a ternary azeotrope comprising the alcohol, benzol and substantially all of the water contained in said mixture, and continuing said distillation to recover a high yield of a substantially anhydrous glycidol.

2. A process for the conversion of glycerol monohalohydrin to the corresponding glycidol which comprises commingling the starting material with a basic-acting compound and with dioxane, maintaining said mixture at subatmospheric temperature and in a state of agitation for a period of time sufficient to cause the conversion of the halohydrin to the glycidol, thereby forming a mixture containing water, salt, dioxane, unreacted glycerol monohalohydrin and glycidol, separately removing the salt from said mixture, distilling the remaining mixture under a reduced pressure to recover as an overhead fraction a constant boiling mixture comprising the dioxane and substantially all of the water present in the reaction mixture, and thereafter continuing the distillation to recover as an overhead fraction a high yield of substantially anhydrous glycidol.

3. A process for the conversion of glycerol monohalohydrin to the corresponding glycidol which comprises commingling said starting material with isopropyl alcohol and a basic-acting compound, maintaining said mixture at subatmospheric temperature while in a state of agitation for a period of time sufficient to effect the conversion of the glycerol monohalohydrin to the corresponding glycidol with the formation of a salt and water, removing the salt formed during the conversion reaction, distilling the remaining aqueous mixture to remove as an overhead fraction the water-isopropyl-alcohol constant boiling mixture, and subsequently distilling the residue to recover a substantially anhydrous glycidol.

4. In a process for the production and recovery of glycidol from the corresponding glycerol monohalohydrin which comprises commingling said glycerol monohalohydrin with a basic-acting compound and an effective quantity of a solvent selected from the group consisting of isopropyl alcohol, n-propyl alcohol, n-butyl alcohol, secondary butyl alcohol, isobutyl alcohol, amyl alcohol, dioxane, and mixtures of alcohols with benzol, effecting the conversion reaction to produce a mixture containing the solvent, water, salt, unreacted glycerol monohalohydrin and glycidol, distilling said mixture to recover as an overhead fraction the solvent-water constant boiling mixture thereby leaving a substantial anhydrous residue, and continuing the distillation to recover a high yield of a substantially anhydrous glycidol.

5. In a process for the production and recovery of a hydroxy-epoxide by reacting a halogenated polyhydric alcohol having an excess of carbinol groups over the number of halogen atoms per molecule, with a basic-acting compound capable of neutralizing the evolved halogen halide, the steps of carrying out the reaction in the presence of solvent selected from the group consisting of isopropyl alcohol, n-propyl alcohol, n-butyl alcohol, secondary butyl alcohol, isobutyl alcohol, amyl alcohol, dioxane, and mixtures of alcohols with benzol, thereby producing a reaction mixture containing the solvent, water, a salt and the hydroxy-epoxide, distilling the mixture thus obtained under subatmospheric pressure to remove as an overhead fraction a constant boiling mixture comprising the added solvent and substantially all of the water present in the aqueous reaction mixture, thereby leaving a substantially anhydrous residue containing the hydroxy-epoxide, and continuing the distillation under reduced pressure to recover as an overhead fraction a high yield of the hydroxy-epoxide in a substantially anhydrous condition.

6. In a process for the production and recovery of a hydroxy-epoxide by reacting a halogenated polyhydric alcohol, having an excess of carbinol groups over the number of halogen atoms per molecule, with a basic-acting compound capable of neutralizing the evolved hydrogen halide, the steps of carrying out the reaction in the presence of a solvent selected from the group consisting of isopropyl alcohol, n-propyl alcohol, n-butyl alcohol, secondary butyl alcohol, isobutyl alcohol, amyl alcohol, dioxane, and mixtures of alcohols with benzol, thereby producing a reaction mixture containing the solvent, water, a salt and the hydroxy-epoxide, and distilling the mixture thus obtained to remove as an overhead fraction a constant boiling mixture comprising the added solvent and water, thereby leaving a substantially anhydrous residue containing the hydroxy-epoxide.

7. A process for the conversion of a glycerol monohalohydrin to the corresponding glycidol and for the recovery of glycidol from the water and salt formed during the conversion, which comprises reacting a glycerol monohalohydrin with a basic-acting compound in the presence of a water-soluble solvent which has substantially no solubility for the salt formed during said reaction, is substantially non-reactive with the reactants and the products of reaction, is capable of forming a constant boiling mixture with substantial amounts of water present in the reaction mixture and boils at a temperature substantially below the boiling temperature of the glycidol, and thereupon subjecting the reaction mixture to a fractional distillation under reduced pressure to recover a high yield of substantially anhydrous glycidol.

8. A process for the conversion of a glycerol monohalohydrin to the corresponding glycidol and for the recovery of the glycidol from the products of reaction, which comprises reacting a glycerol monohalohydrin with an aqueous solution of a basic-acting compound in the presence of a water-soluble solvent which has substantially no solubility for the salt formed during said reaction, is substantially non-reactive with the reactants and the products of reaction, is capable of forming a constant boiling mixture which contains a substantial amount of water and boils at a temperature substantially below the boiling temperature of the glycidol, continuing said reaction to effect a substantial conversion of the glycerol monohalohydrin to the glycidol, separating the salt formed during said reaction, and thereupon subjecting the remaining reaction mixture to a fractional distillation under reduced pressure to recover a high yield of substantially anhydrous glycidol.

9. The process according to claim 8, wherein the solvent is employed in a quantity at least sufficient to remove as a constant boiling mixture substantially all of the water present in the aqueous glycidol-containing reaction mixture, and wherein said reaction mixture is neutralized prior to the vacuum distillation step.

10. A process for the conversion of a halogenated polyhydric alcohol to the corresponding hydroxy-epoxide and for the recovery of the hydroxy-epoxide from the water and salt formed during the conversion, which comprises reacting a halogenated polyhydric alcohol with a basic-acting compound in the presence of a water-soluble solvent which has substantially no solubility for the salt formed during the reaction, is substantially non-reactive with the reactants and the products of reaction, is capable of forming a constant boiling mixture which contains a substantial amount of water and boils at a temperature substantially below the boiling temperature of the hydroxy-epoxide, continuing the reaction to effect a substantial conversion of the halogenated polyhydric alcohol to the corresponding hydroxy-epoxide, and thereupon subjecting the reaction mixture to a fractional distillation under reduced pressure to recover a high yield of the substantially anhydrous hydroxy-epoxide.

11. In a process for the production of a hydroxy-epoxide by the interaction of an aqueous solution of a basic-acting compound with a halogenated polyhydric alcohol having an excess of carbinol groups over the number of halogen atoms per molecule, the improvement which comprises adding a water-soluble solvent to the halogenated polyhydric alcohol substantially together with the basic-acting compound, said solvent having substantially no solubility for the salt formed during the conversion of the alcohol to the epoxide, boiling substantially below the boiling temperature of the formed hydroxy-epoxide, being substantially non-reactive with the reactants and the reaction products, and capable of forming a constant boiling mixture containing a substantial quantity of water, effecting the conversion of the halogenated polyhydric alcohol to the corresponding hydroxy-epoxide, and distilling the reaction mixture thereby first removing the solvent-water constant boiling mixture and thereafter recovering a high yield of the substantially anhydrous hydroxy-epoxide.

12. In a process for the production of a hydroxy-epoxide by reacting a halogenated polyhydric alcohol, wherein the carbinol groups are in excess of the halogen atoms, with a basic-acting compound, the step of recovering the hydroxy-epoxide from the resulting aqueous reaction mixture which comprises subjecting said reaction mixture to distillation in the presence of a solvent boiling substantially below the boiling temperature of the hydroxy-epoxide, having substantially no solubility for the salt formed during the dehydrohalogenation of the halogenated polyhydric alcohol, capable of forming a constant boiling mixture with substantial amounts of water present in the reaction mixture, and being substantially non-reactive with the reactants and the reaction products, thereby removing by said distillation the solvent-water mixture and leaving a substantially anhydrous residue containing the hydroxy-epoxide, said solvent having been present with the reactants during the reaction.

13. A process for the production and recovery of glycidol from the corresponding glycerol monohalohydrin which comprises commingling a glycerol monohalohydrin with an aqueous solution of a basic-acting compound and an effective quantity of a solvent selected from the group consisting of isopropyl alcohol, n-propyl alcohol, isobutyl alcohol, amyl alcohol, dioxane, and mixtures of alcohols with benzol, effecting the dehydrohalogenation reaction to produce a mixture containing the solvent, water, salt, unreacted glycerol monohalohydrin and glycidol, separating the salt from the reaction mixture, neutralizing the reaction mixture, and thereupon subjecting said de-salted and neutralized reaction mixture to distillation to recover a high yield of a substantially anhydrous glycidol.

14. In a process according to claim 11, wherein the solvent is employed in a quantity at least sufficient to remove as the constant boiling mixture substantially all of the water present in the aqueous hydroxy-epoxide-containing reaction mixture.

15. In a process for the production of a hydroxy-epoxide by reacting a halogenated polyhydric alcohol, wherein the carbinol groups are in excess of the halogen atoms, with a basic-acting compound, the step of recovering the hydroxy-epoxide from the resulting aqueous reaction mixture, which comprises distilling said reaction mixture under a subatmospheric pressure in the presence of an effective quantity of a water-soluble solvent which has substantially no solubility for the salt formed during the conversion of the halogenated polyhydric alcohol to the corresponding hydroxy-epoxide, is substantially non-reactive with the reactants and the products of reaction, is capable of forming a constant boiling mixture which contains a substantial amount of water and boils at a temperature substantially below the boiling point of the hydroxy-epoxide when distilled under subatmospheric pressures, thereby first removing by said distillation the solvent-water constant boiling mixture and thereafter recovering a high yield of the substantially anhydrous hydroxy-epoxide, said solvent having been present with the reactants during the reaction.

KENNETH E. MARPLE.
THEODORE W. EVANS.